A. E. BRILLIÉ.
MOTOR VEHICLE WITH THREE AXLES.
APPLICATION FILED NOV. 7, 1907.
915,733.
Patented Mar. 23, 1909.
2 SHEETS—SHEET 1.
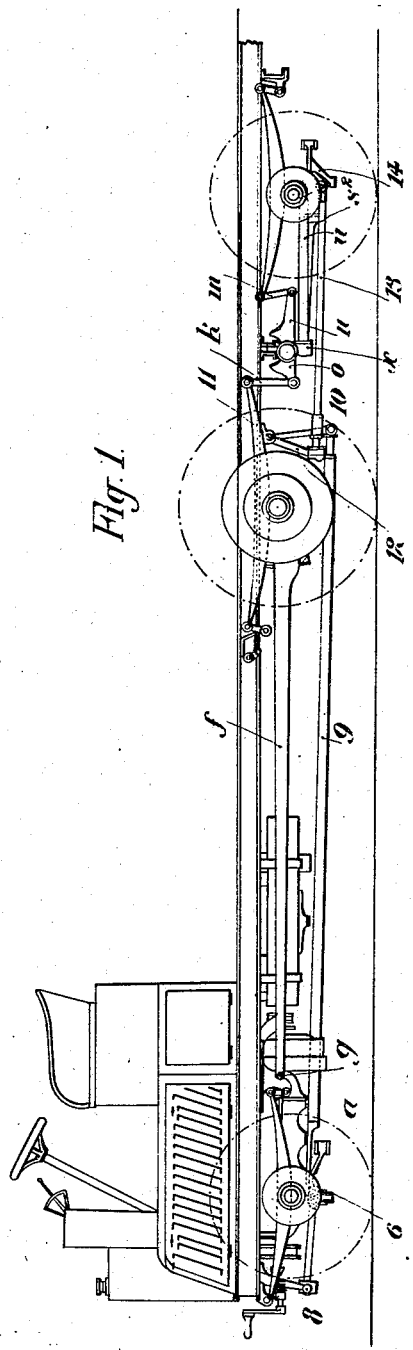
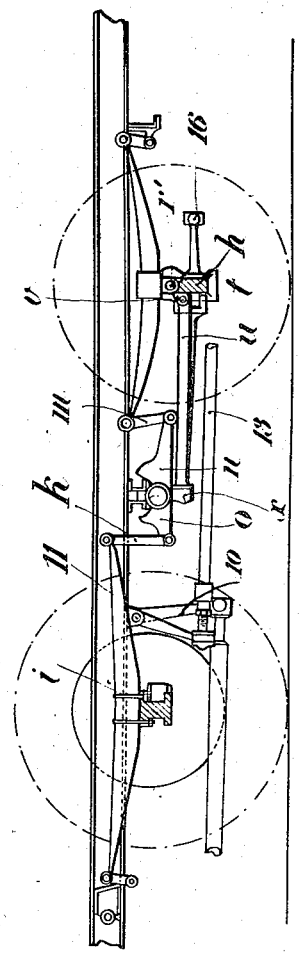
Witnesses
Inventor
Auguste Eugène Brillié
by
his Attorney A. E. BRILLIÉ.
MOTOR VEHICLE WITH THREE AXLES.
APPLICATION FILED NOV. 7, 1907.
915,733.
Patented Mar. 23, 1909.
2 SHEETS—SHEET 2.
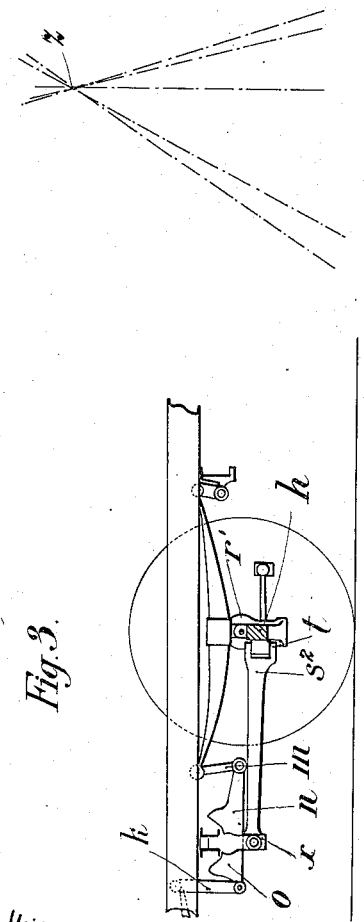
Witnesses:
Inventor
Auguste Eugène Brillié
by
his Attorney

UNITED STATES PATENT OFFICE.

AUGUSTE EUGÈNE BRILLIÉ, OF PARIS, FRANCE, ASSIGNOR TO SOCIÉTÉ ANONYME DES AUTOMOBILES EUGÈNE BRILLIÉ, OF PARIS, FRANCE.

MOTOR-VEHICLE WITH THREE AXLES.

No. 915,733.     Specification of Letters Patent.     Patented March 23, 1909.

Application filed November 7, 1907. Serial No. 401,103.

*To all whom it may concern:*

Be it known that I, AUGUSTE EUGÈNE BRILLIÉ, citizen of the Republic of France, residing at 60 Boulevard Pereire, Paris, France, have invented certain new and useful Improvements in Motor-Vehicles with Three Axles, of which the following is a specification.

The present invention has for its object an arrangement allowing of the realization of a six-wheeled motor vehicle, comprising two steering wheels at the rear as well as two in front.

The annexed drawings show by way of example one form of carrying out the arrangement.

Figure 1 shows the vehicle in elevation. Figs. 2 and 3 are part longitudinal sections, and:—Fig. 4 is a plan.

The fore part of the vehicle has nothing peculiar in its arrangement.

In the figures under consideration, the motor $a$ placed in front transmits its motion to the driving wheels $b$ and $c$ by means of a cardan shaft $d$ and differential gearing $e$ carrying at its two extremities pinions which gear with toothed drums made integral with the driving wheels, the position of the axle being constrained by beams $f$ pivotally connected at $g$ to a fixed point on the chassis. The system herein proposed may alternatively comprise any other transmission arrangement.

The chief features of the invention relate to:—1. The connection contrivance between the suspenders of the rear axle $h$ and that of the driving axle $i$ to allow of the wheels adapting themselves to the irregularities of the ground without overstraining the springs. 2. The connecting arrangements between the steering pivots (3, 4) of the back wheels and those (1, 2) of the front wheels to direct the axles of the four steering wheels toward a common center.

The twin rods $k$ depending from the rear ends of the central springs and the twin front rods $m$ of the rear springs are pivotally attached at their lower ends to the two extremities of a horizontal balance-lever $n$—$o$. This balance-lever has two unequal arms $n$—$o$ designed to put a greater load on the driving axle $i$ than on the rear axle $h$. The effect of this contrivance is that if the back wheels $r$ $s$ for example are jolted in passing over an obstacle (stone, ridge, etc.), the balance levers $o$—$n$ intervene to transfer a portion of the force due to the displacement of the rear axle $h$ to the springs of the intermediate axle $i$. In the same way the back springs are affected by the displacements of the intermediate axle. When the balance arm $n$—$o$ oscillates, the springs which it constrains are inclined in accordance with the vertical displacement of the links connecting them to the balance arm; if the springs were rigidly secured to the axles, the latter would be inclined at the same time. Under these conditions it is easy to see that if a single wheel (a back one for example) were vertically displaced by encountering an obstacle, the oscillatory movements of the springs and of the balance lever on the corresponding side would be counteracted by the axles, which are assumed to be rigidly secured at their other ends to springs which resist the displacement, the wheel not being displaced vertically on this side. To overcome this difficulty, it is found convenient to pivot the wheels to the springs as shown in Fig. 2. In this figure, the pivoted connection $r'$ is shown only for the back springs, which, on encountering irregularities incline more than the front springs by reason of the difference in length of the arms $n$ and $o$ of the balance-lever; but the connection can be equally well applied to the intermediate axle $i$. The pivotal connection referred to is similar for the springs at both sides of the vehicle and hence only one such connection, $r'$, has been shown in the drawing. The rear axle $h$ not being constrained by the springs is in a state of unstable equilibrium and tends to oscillate about its pivots $r'$ therefore it is necessary for this axle to be secured to the chassis by connecting links to maintain it in position. One of the two connecting links $s^2$, the right hand one for example, Fig. 3, has at its rear extremity a pivoted connection having a vertical axis so arranged that the middle plane of the axle shall in its vertical displacements be tangential to the arc described by the rear extremity $t$ of this link. The other link $u$ on the left (Fig. 2) has a horizontal axis at $v$. These two links have at the fore end jointed connections $x$, which secure them to fixed points on the chassis.

In cases in which the intermediate springs are secured to the axle, the preceding arrangement would be applicable also to this axle.

Instead of the above arrangement, use could be made for the same purpose of the following arrangements:—Instead of having on the same axle, the two springs pivoted at r', one of the two springs could be pivoted and the other rigidly mounted.

To effect the connection of the axles of the front and rear wheels, use is made of the following arrangement: The pivot (2) carries a transverse lever (5) which is controlled by the steering gear (7, 8). This lever by the joint (6) and link (9) is connected to a lever (10), secured on a cross shaft (11). This shaft carries a second lever (12) which by means of a link (13) constrains the movements of the lever (14) made integrally with the pivot (3) of the wheel r. The pivots (1, 2) of the two front wheels p, q, being connected by a link (15), and those of the back wheels, by a link (16), it is seen that the four wheels are interconnected in such a manner that their journals would meet in a common center point (z), situated upon the axis of the driving wheels. In order to effect the connection in such a way as to cause convergence of the journals, the angle of displacement of each spindle not being the same, the levers (10) and (12) secured to the shaft (11) are inclined to one another at a certain angle, characterized by the fact that the lower pivoted connection of the lever (10) governed by the forward link (9) is behind that of the lever (12) which governs the rearward link (13.)

I claim.

In a motor vehicle, the combination with a pair of front steering wheels and a pair of rear steering wheels, of a pair of intermediate driving wheels, spring suspenders for the driving and steering wheels, connections between said spring suspenders whereby a portion of the force due to vertical displacement of one pair of wheels is transmitted to the spring of another pair of wheels, a pivotal connection between one of the said pairs of wheels and its spring suspender, and means for maintaining the equilibrium of said last mentioned pair of wheels, said means comprising a pair of links pivoted to a common point, one of said links having its free end connected by a vertical axis to the wheel axle near one wheel and the free end of the other link being connected by a horizontal axis to the wheel axle near the other wheel.

In testimony whereof I have affixed my signature in presence of two witnesses.

AUGUSTE EUGENE BRILLIÉ.

Witnesses:
 HENRI MORIM,
 LOUIS GARDET.